United States Patent
Gdak et al.

(10) Patent No.: US 11,922,328 B1
(45) Date of Patent: Mar. 5, 2024

(54) GENERATING MACHINE-LEARNING MODEL FOR DOCUMENT EXTRACTION

(71) Applicant: Snowflake Inc., Bozeman, MT (US)

(72) Inventors: Michal Gdak, Warsaw (PL); Ganeshan Ramachandran Iyer, Redmond, WA (US); Tomasz Malisz, Bialystok (PL); Mikolaj Niedbala, Poznan (PL); Pawel Pollak, Warsaw (PL); Saurin Shah, Kirkland, WA (US); Jan Tomasz Topinski, Izabelin (PL); Daria Wieteska, Warsaw (PL)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/472,883

(22) Filed: Sep. 22, 2023

Related U.S. Application Data

(60) Provisional application No. 63/495,174, filed on Apr. 10, 2023.

(51) Int. Cl.
  *G06N 5/022* (2023.01)
(52) U.S. Cl.
  CPC .................................... *G06N 5/022* (2013.01)
(58) Field of Classification Search
  CPC .................................................... G06N 5/022
  See application file for complete search history.

(56) References Cited

U.S. PATENT DOCUMENTS

| | | | |
|---|---|---|---|
| 10,031,912 B2* | 7/2018 | Allen | G06F 16/93 |
| 11,178,389 B2* | 11/2021 | Sinha | A61B 3/032 |
| 11,194,963 B1* | 12/2021 | Schafer | G06F 40/205 |
| 11,768,884 B2* | 9/2023 | Benincasa | G06F 16/316 707/602 |
| 2010/0235451 A1* | 9/2010 | Yu | G06F 15/16 709/206 |
| 2011/0125511 A1* | 5/2011 | Bakst | G06Q 10/00 715/764 |
| 2014/0278916 A1* | 9/2014 | Nukala | G06Q 30/0243 705/14.42 |
| 2015/0120634 A1* | 4/2015 | Tateno | G06Q 30/0282 706/46 |
| 2020/0026913 A1* | 1/2020 | Northrup | G06F 16/35 |
| 2021/0089563 A1* | 3/2021 | Grabau | G06F 16/93 |
| 2021/0209500 A1* | 7/2021 | Hu | G06N 5/04 |
| 2021/0217209 A1* | 7/2021 | Elder | G06F 16/7837 |
| 2021/0406815 A1* | 12/2021 | Mimassi | G06Q 10/063118 |
| 2023/0186104 A1* | 6/2023 | Noble | G06N 3/105 706/15 |
| 2023/0336228 A1* | 10/2023 | Chintalapudi | H04L 1/0009 |

* cited by examiner

*Primary Examiner* — Etienne P Leroux
(74) *Attorney, Agent, or Firm* — Schwegman Lundberg & Woessner, P.A.

(57) ABSTRACT

Systems and methods for generating a machine-learning (ML) model for extracting information from one or more electronic documents, where the ML model can be used as a data object, which can be part of a database command or as part of a document information extraction process that is continuously running (e.g., document information extraction pipeline).

20 Claims, 12 Drawing Sheets

Add Project

To create a project you need to add a unique project name, select a model and then upload documents. Learn more

Project Name

Add project name

602

Model

604

Standard
A universal model to start with any type of use case.

Invoices
Pre-trained model adjusted to work with invoices.

Paystubs
Pre-trained model adjusted to work with paystubs.

Cancel    Next

Training Documents                                              ⊕ [+ Add Question]

| employeeName | What is the employee name? |
| Score: 0.97 | Maryl Greenhome |

| employeeAddress | What is the employee address? |
| Score: 0.83 | 3109 SE 33rd Terrace |

| employeeID | What is the employee ID? |
| Score: 0.91 | 12380 |

| deductionTypes | What are the deduction types? |
| Score: 0.91 | Federal Tax |
| Score: 0.67 | Florida State Tax |
| Score: 0.99 | SDI |
| Score: 0.92 | Soc Sec / OASDI |
| Score: 0.86 | Health Insurance Tax |

| Training Documents | + Add Question |
|---|---|
| employeeName | What is the employee name? |
| Score: 0.89 | Michael Rickson |
| employeeAddress | What is the employee address? |
| Score: 0.87 | 4 Winter Rd. |

Earnings Statement

GaMa Incorporated

GaMa Inc.
1408 Johnson St.
06602 Bridgeport, CT

| Pay Period | Pay Date |
|---|---|
| 01/09/20-27/09/20 | 28/09/20 |

| Employee | Employee ID | SSN |
|---|---|---|
| Michael Rickson<br>4 Winter Rd.<br>06602 Bridgeport, CT | 000000 | 049-02-3160 |

| Gross Earnings | | This Period | YTD |
|---|---|---|---|
| Total Hours | 160 | $3990.00 | $119700.00 |
| Total Earnings | | $3990.00 | $119700.00 |

| Statutory Deductions | This Period | YTD |
|---|---|---|
| FICA - Medicare | $57.86 | $1735.65 |
| FICA - Social Security | $247.38 | $7421.40 |
| Federal Income Tax | $222.44 | $6673.28 |
| State Income Tax | $172.62 | $5178.52 |
| Total Deductions | $700.29 | $21008.85 |

| | This Period | YTD |
|---|---|---|
| Net Pay | $3289.71 | $98691.15 |

GENERATING MACHINE-LEARNING MODEL FOR DOCUMENT EXTRACTION

CROSS REFERENCE TO RELATED APPLICATION

This application claims priority to and the benefit of U.S. Provisional Patent Application No. 63/495,174, filed on Apr. 10, 2023, which is incorporated herein by reference.

TECHNICAL FIELD

Embodiments of the disclosure relate generally to electronic document processing and, more specifically, to generating a machine-learning (ML) model for extracting information from one or more electronic documents, where the ML model can be used as a data object, which can be part of a database command or as part of a document information extraction process that is continuously running (e.g., document information extraction pipeline).

BACKGROUND

Individuals use various types of electronic documents (also referred to herein as "documents") including scanned handwritten documents, scanned forms, large documents (reports), word processing documents (e.g., DOCX documents), postscript documents (e.g., PDF documents), and the like. Additionally, documents can sometimes be in the form of images (e.g., pictures of pages). A given user may want to process these and other document types and use a document process, such as a machine-learning (ML) model-based process, to extract data points from documents. For instance, the given user can set up a document information extraction pipeline (e.g., document processing pipeline) that is configured to ingest (e.g., continuously ingest) multiple documents of various types, and process each of the documents using one or more ML models to extract data points of interest to the given user.

BRIEF DESCRIPTION OF THE DRAWINGS

The present disclosure will be understood more fully from the detailed description given below and from the accompanying drawings of various embodiments of the disclosure.

FIG. 6 illustrates an example user interface for adding (e.g., creating) a new project for a ML model used for document information extraction, according to some embodiments.

FIGS. 8-11 illustrate example user interfaces that present electronic documents, present data points, present questions associated with data points, present extracted values associated with data points, present confidence scores, receive user feedback, and start a training process of a ML model, according to some embodiments.

DETAILED DESCRIPTION

Figure 1:
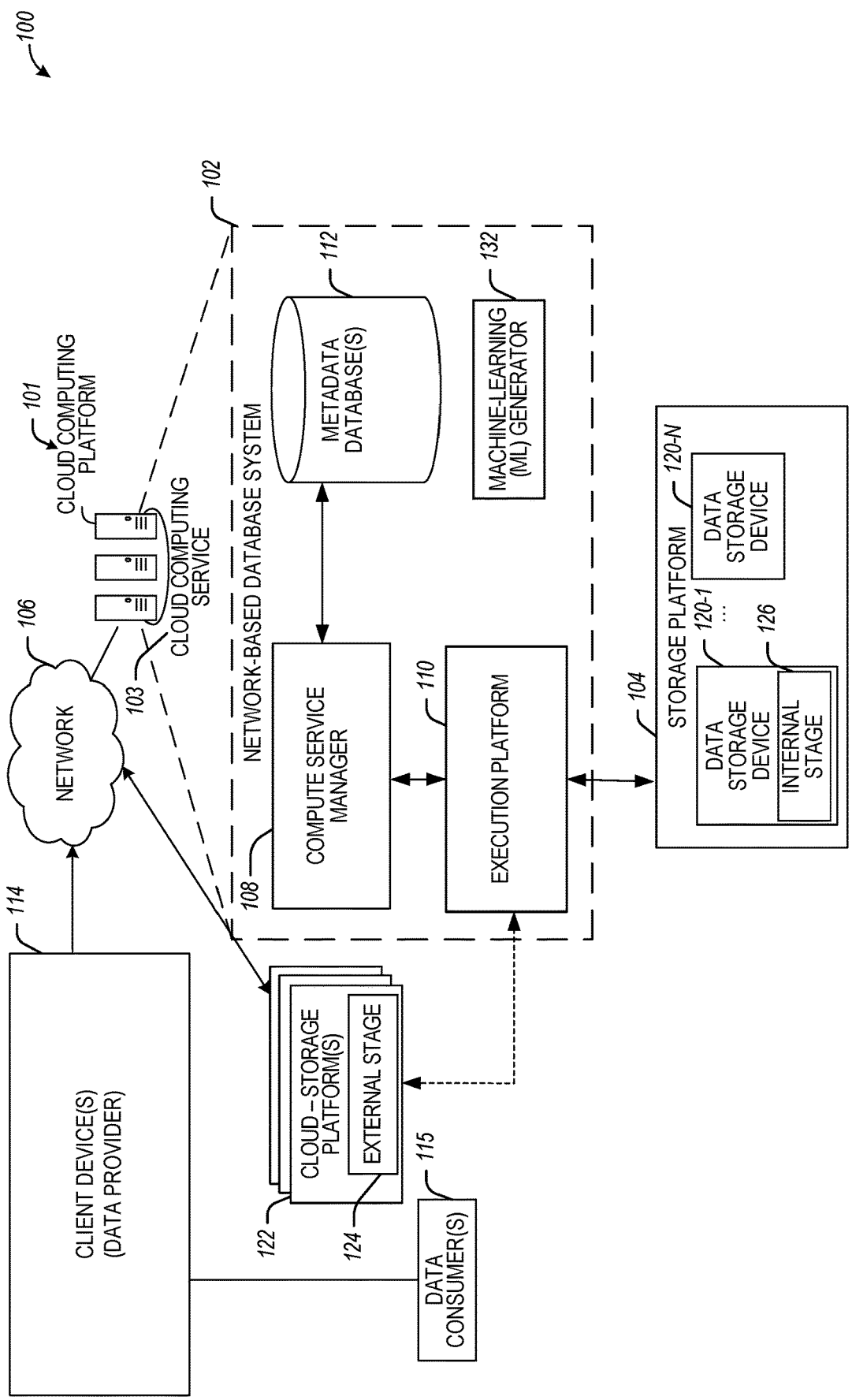
FIG. 1 illustrates an example computing environment that includes a network-based database system in communication with a cloud storage platform, according to some embodiments.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Generally, ML models are not guaranteed to generate accurate results and, in the context of document processing, this can result in inaccurate data extraction. To mitigate/address this issue, users who desire a high level of accuracy during document data extraction can use training to adjust or fine-tune a ML model for better accuracy, such as with respect to particular documents (e.g., banking statements, drivers licenses, medical insurance cards, pay stubs, etc.).

Various embodiments described herein provide for systems, methods, devices, instructions, and like for generating a machine-learning (ML) model for extracting information from one or more electronic documents, where the ML model can be used as a data object, which can be part of a database command or as part of a document information extraction process that is continuously running (e.g., document information extraction pipeline). Use of various embodiments can (e.g., via a project) generate a ML model (e.g., fine-tuned version of a base ML model) and can expose the generated ML model as a data object, which can be used as a database function (e.g., SQL function or command) that a user (e.g., data engineer) can use to create a document information extraction pipeline (e.g., output of which can be stored in one or more tables or stages of a data platform). For some embodiments, a ML model comprises a large-language model (LLM).

For some embodiments, a user that has context and domain knowledge about electronic documents, such as a business user (e.g., in a finance department responsible for reconciling the expense reports with receipts) or a domain specialist user, can train a ML model for extraction of information from one or more types of electronic documents, such as bank statements, identification cards (e.g., driver license, passport), billing statement, and the like. The user can use various embodiments described herein to improve the accuracy of the ML model such that the ML model extracts information from electronic documents that meets the user's expectations. For instance, a user (e.g., business user) can login to a data platform, and launch a user interface (e.g., training user interface) for exploring a ML model, training a ML model, or both.

In the beginning, the user can create a new project or select an existing project that is associated with extracting information from electronic documents of a certain type (e.g., documents containing a certain type of information, such as bank statements). For example, the user can see all the projects in a drop down their role has access to, or if the user has the appropriate privilege, the user can create a new project. When the user creates a new project, electronic documents need to be imported in the project from a local computer system.

According to various embodiments, the imported set of electronic documents can be used for exploration of a ML model, training (e.g., fine-tuning) of the ML model, or both. The collection of imported electronic documents can be associated with the project. Users can also import more electronic documents to the project for further exploration or training of the ML model. The imported electronic documents can be stored in (e.g., copied to) the project.

Initially, a new project can be configured with a default foundational ML model (e.g., zero-shot ML model) or be configured with a default ML model that is pre-trained (e.g., for certain use cases of electronic documents, such as a use-case ML model that understands "bank statements"), which can be used to start exploration of electronic documents. When a new project is created, the user can choose either a zero-shot ML model or a pre-trained ML model that closely matches their use case.

According to some embodiments, the user starts defining data points and starts asking questions in natural language using the project's base ML model to explore electronic documents or to annotate electronic documents for training purposes. Eventually, values extracted for the defined data points can be stored in a column in a target table (e.g., a given data point name conforms to a column identifier). The data points or the questions can be stored in association with (e.g., persisted in) the project.

In some instances, the base ML model can be accurate enough for the user's purposes and the user can simply save the project and use the base ML model for their project as-is. However, in instances where the base ML model is not sufficiently accurate for the user's purposes, the user can then generate a fine-tuned ML model based on the base ML model. For some embodiments, to generate a fine-tuned ML model, the user can annotate one or more uploaded electronic documents, and start a training process (e.g., clock on "Start training" button) based on at least those annotations. The training process can generate a new custom ML model, and this custom ML model can now become the default ML model associated with the project. The binary of the custom ML model can be stored in association with (e.g., persisted in) the project. If the user can annotate a few more (additional) uploaded electronic documents and starts training again, a new version of the custom ML model can be generated, which can replace the last version of the custom ML model in the project. The progress of the training process can be graphically presented in the user interface being used by the user to train the ML model. The training process can be aborted by the user if they desired.

Various embodiments provide (e.g., user interface) for evaluation of a ML model (e.g., base ML model or a custom ML model, such as a fine-tuned ML model) that can happen on the fly and can generate a live confidence score for extracted values for data points, which can be visible to the users during exploration. For example, as a ML model is being explored with a set of uploaded electronic documents, extracted values for data points (e.g., and their associated questions) are presented (e.g., displayed) in the user interface for a given electronic document, and a user can annotate (e.g., accept, reject, or manually change) the extracted values. As used herein, a confidence score can be provided (e.g., outputted) by a ML model for a value the ML model extracts from an electronic document for a data point, where the value is extracted based on a question associated with the data point, and where the confidence score (e.g., ranging from 0 to 1) represents how confident the ML model is in the extracted value being accurate (e.g., in view of the question associated with the data point). As user annotates one or more electronic documents (i.e., accepts extracted values as-is or changes/modifies the extracted values), various embodiments evaluate the ML model on the fly and immediately present the confidence scores for extracted values to the user. For example, the user interface can display (e.g., during evaluation or training) a detailed view of extracted values for a given electronic document (e.g., one that is currently displayed in the user interface), the user interface can display a confidence score (provided by the ML model) for each data point value extracted from the given electronic document, and the user interface can display an average confidence score for the given electronic document (e.g., average of confidence scores for all data point values extracted by the ML model for the given electronic document). Depending on the embodiment, the electronic documents used for evaluation/exploration may not be the ones used for training the ML model. If there are no electronic documents available for evaluation/exploration, the user can be prompted to add more electronic documents to the project.

For various embodiments, a ML model (e.g., custom or fine-tuned ML model that is generated) described herein is generated as a data object, such as a database object, which can be used on a data platform for various data operations. For example, a user can use the data object as part of a database command (e.g., Structured Query Language (SQL) query) or as part of a document information extraction process that is continuously running (e.g., document information extraction pipeline) and that uses the data object for information extraction process. For instance, a user (e.g., ML engineer) can operationalize the generated ML model by using a predict(<file_url>) function associated with the generated ML model (e.g., a predict function of a project instance that comprises the generated ML model). An example of using this prediction function in a SQL command can be as follows:

select document_ML_model!predict(file_url, 'model_version_number') from directory(@my_documents) limit 10;

The predict( ) function can pass a model version parameter, which can permit the user to choose which version of the model they want to use for prediction. The select command can be paired with an insert command and can be used in a document information extraction pipeline. For instance, with respect to a document information extraction pipeline, the user can operationalize the generated ML model by creating a pipeline for continuous document processing that specifies the data object of the generated ML model. The data points and the questions used to train and generate the generated ML model could be encoded into the project associated with the generated ML model. After evaluating the generated ML model (e.g., executing test SQL commands and reviewing results), the user can create a target table (e.g., database table) where the data point values extracted from a target set of electronic documents can be stored. The target table can have one or more of the following columns: file location (e.g., universal resource locator (URL)); project name; one column for each data point for which a value is to be from an electronic document. The user can create the target table with whatever structure they want, can even create a staging table with a simple variant column, and can use an evolving schema (e.g., with a copy command) to automatically add columns to the target table.

To generate a document information extraction pipeline, the user can run a copy command to run batch processing of the existing electronic documents. For instance, the copy command can use a file processor function (e.g., for processing unstructured data files for extraction), as follows:

copy into <target_table> from directory(@my_documents) file_processor=(type=document_ai scanner=document_ML_model!predict) match_by_column_name=case_sensitive;

Based on this command, the user can create a pipeline for continuous document processing for extracting data point values using the specified (e.g., generated) ML model.

create pipe escrow_processor_pipe as copy into <target_table> from directory(@my_documents) file_processor=(type=document_ai scanner=document_ML_model!predict) match_by_column_name=case_sensitive;

The output from the pipeline for processed (e.g., received or ingested) electronic documents can be stored into the target table.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. Concerning the type of data processing, a data platform could implement online analytical processing (OLAP), online transactional processing (OLTP), a combination of the two, and/or another type of data processing. Moreover, a data platform could be or include a relational database management system (RDBMS) and/or one or more other types of database management systems.

In a typical implementation, a data platform may include one or more databases that are respectively maintained in association with any number of customer accounts (e.g., accounts of one or more data providers), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata (e.g., account object metadata) in association with the data platform in general and in association with, for example, particular databases and/or particular customer accounts as well. Users and/or executing processes that are associated with a given customer account may, via one or more types of clients, be able to cause data to be ingested into the database, and may also be able to manipulate the data, add additional data, remove data, run queries against the data, generate views of the data, and so forth. As used herein, the terms "account object metadata" and "account object" are used interchangeably.

In an implementation of a data platform, a given database (e.g., a database maintained for a customer account) may reside as an object within, e.g., a customer account, which may also include one or more other objects (e.g., users, roles, grants, shares, warehouses, resource monitors, integrations, network policies, and/or the like). Furthermore, a given object such as a database may itself contain one or more objects such as schemas, tables, materialized views, and/or the like. A given table may be organized as a collection of records (e.g., rows) so that each includes a plurality of attributes (e.g., columns). In some implementations, database data is physically stored across multiple storage units, which may be referred to as files, blocks, partitions, micro-partitions, and/or by one or more other names. In many cases, a database on a data platform serves as a backend for one or more applications that are executing on one or more application servers.

FIG. 1 illustrates an example computing environment 100 that includes a database system in the example form of a network-based database system 102, according to some embodiments. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some embodiments, the computing environment 100 may include a cloud computing platform 101 with the network-based database system 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., configuring replication group objects as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as remote computing device or user device 114) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 101 (e.g., cloud computing service 103) by way of a network 106, such as the Internet or a private network. A data consumer 115 can use another computing device to access the data of the data provider (e.g., data obtained via the client device 114).

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata (e.g., account objects used in connection with a replication group object).

Figure 3:
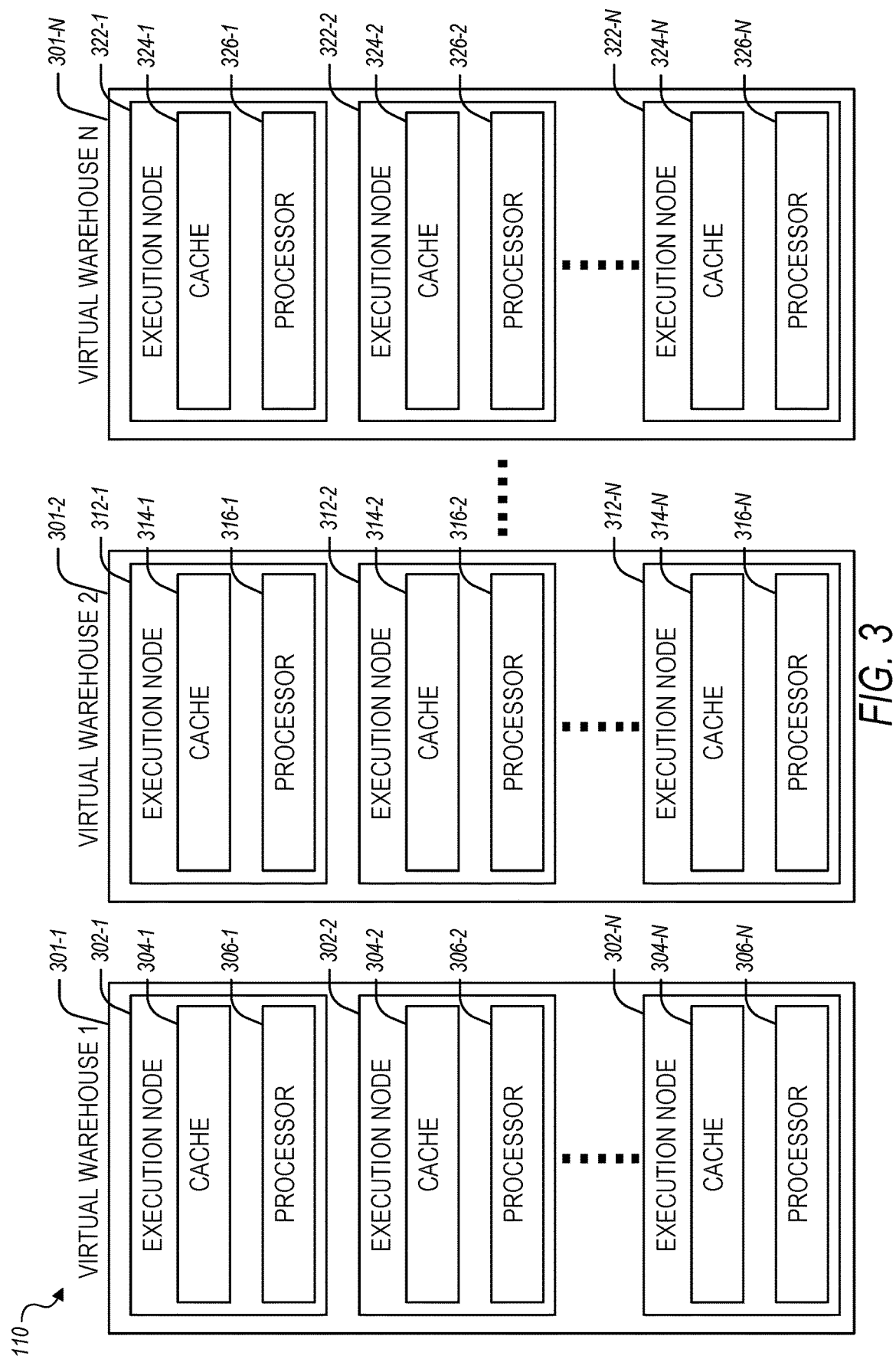
FIG. 3 is a diagram illustrating components of an execution platform, according to some embodiments.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, the network-based database system 102 includes a machine-learning (ML) generator 132. The ML generator 132 comprises suitable circuitry, interfaces, logic, and/or code and is configured to provide generation of ML models for extracting information from one or more electronic documents according to various embodiments. For some embodiments, a ML model generated (for extracting information) comprises a LLM. In some embodiments, the ML generator 132 can include one or more system functions that can be used to implement a method of generating a ML model as described herein. More regarding example methods are described herein with respect to FIGS. 4 and 5.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In some embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During a typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
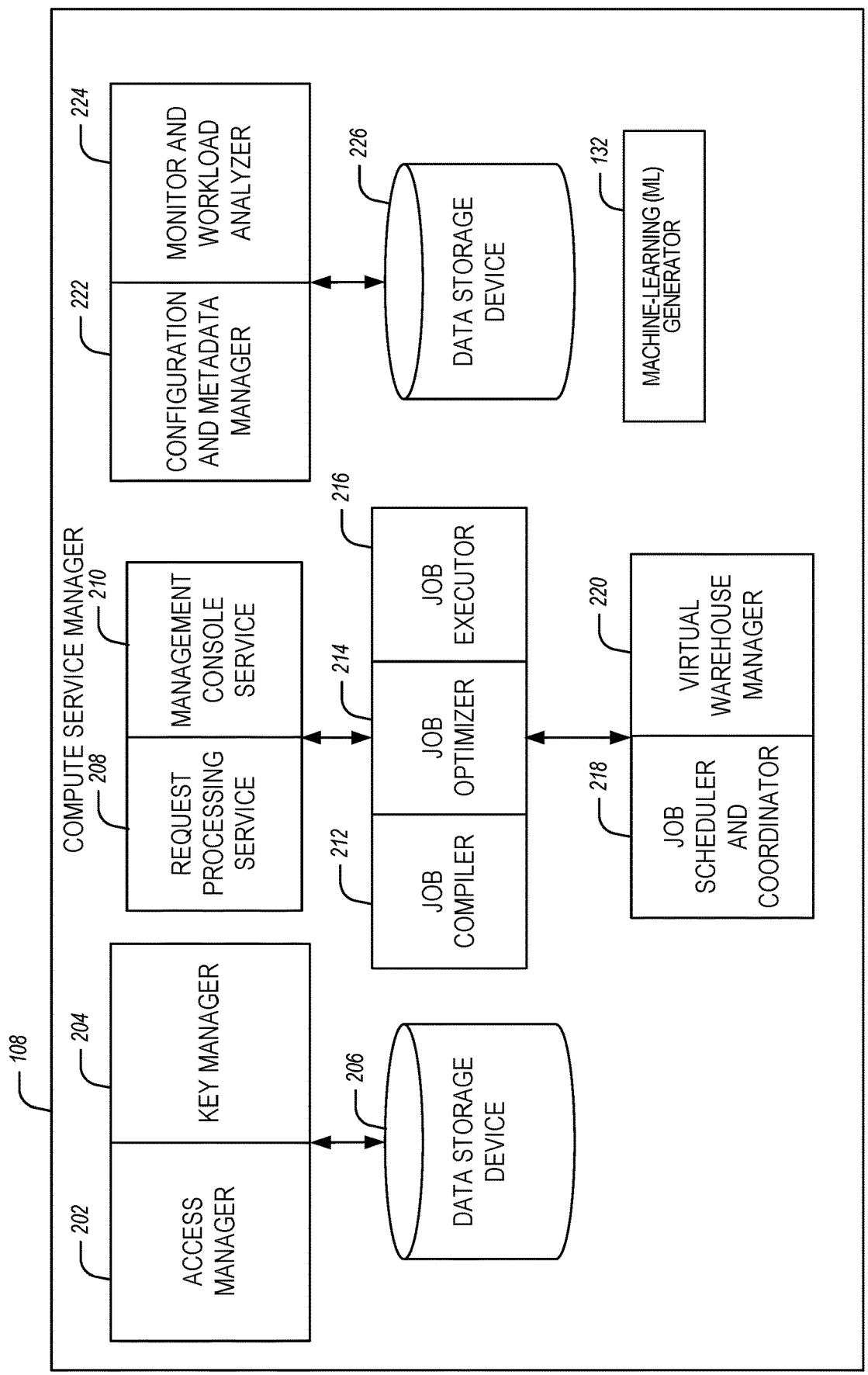
FIG. 2 is a diagram illustrating the components of a compute service manager, according to some embodiments.

FIG. 2 is a block diagram illustrating components of the compute service manager 108, according to some embodiments. As shown in FIG. 2, the compute service manager 108 includes an access manager 202 and a key manager 204 coupled to an access metadata database 206, which is an example of the metadata database(s) 112. Access manager 202 handles authentication and authorization tasks for the systems described herein. The key manager 204 facilitates the use of remotely stored credentials to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 4:
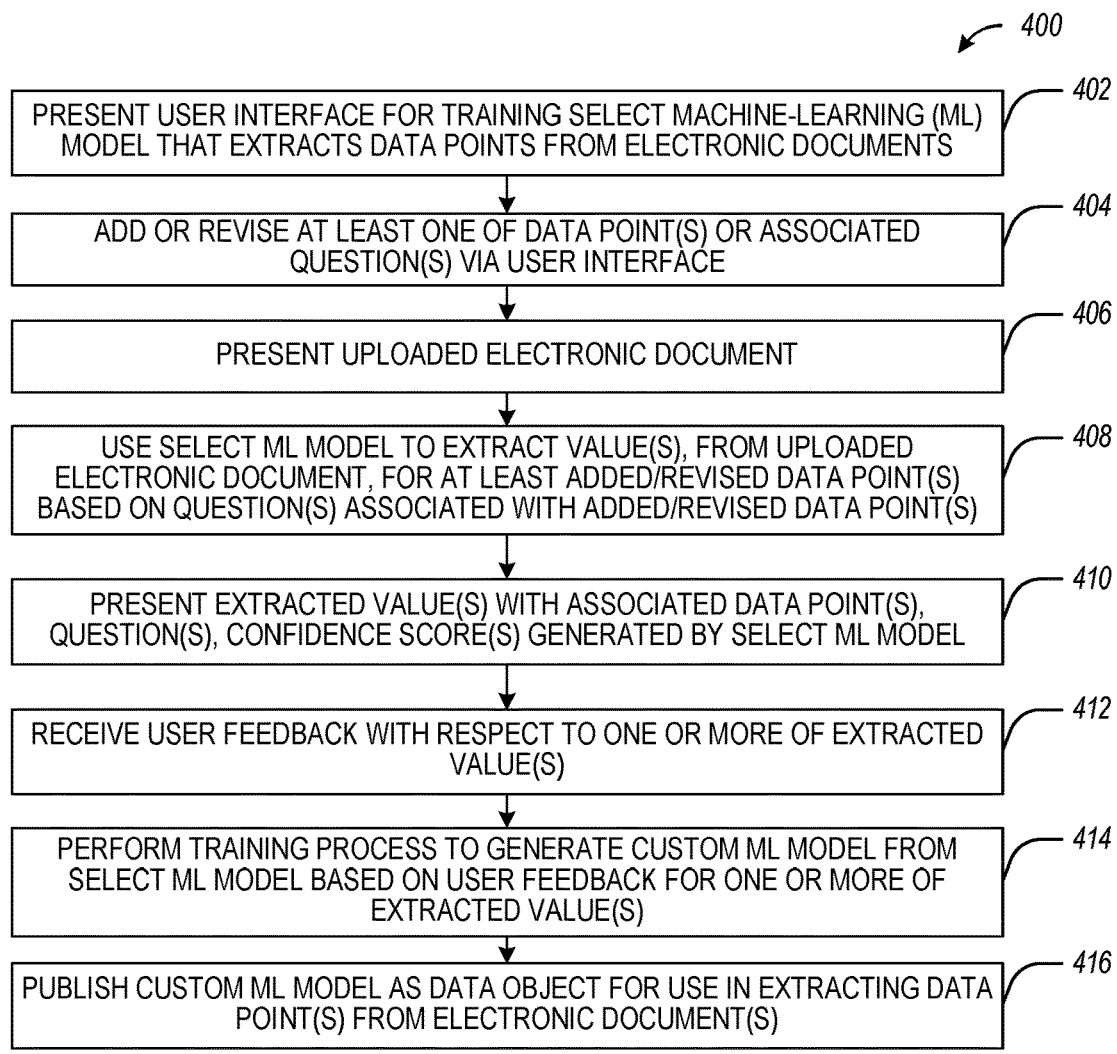
FIG. 4 is a flowchart of example method for generating a machine-learning (ML) model for extracting information from one or more electronic documents, according to some embodiments.
Figure 5:
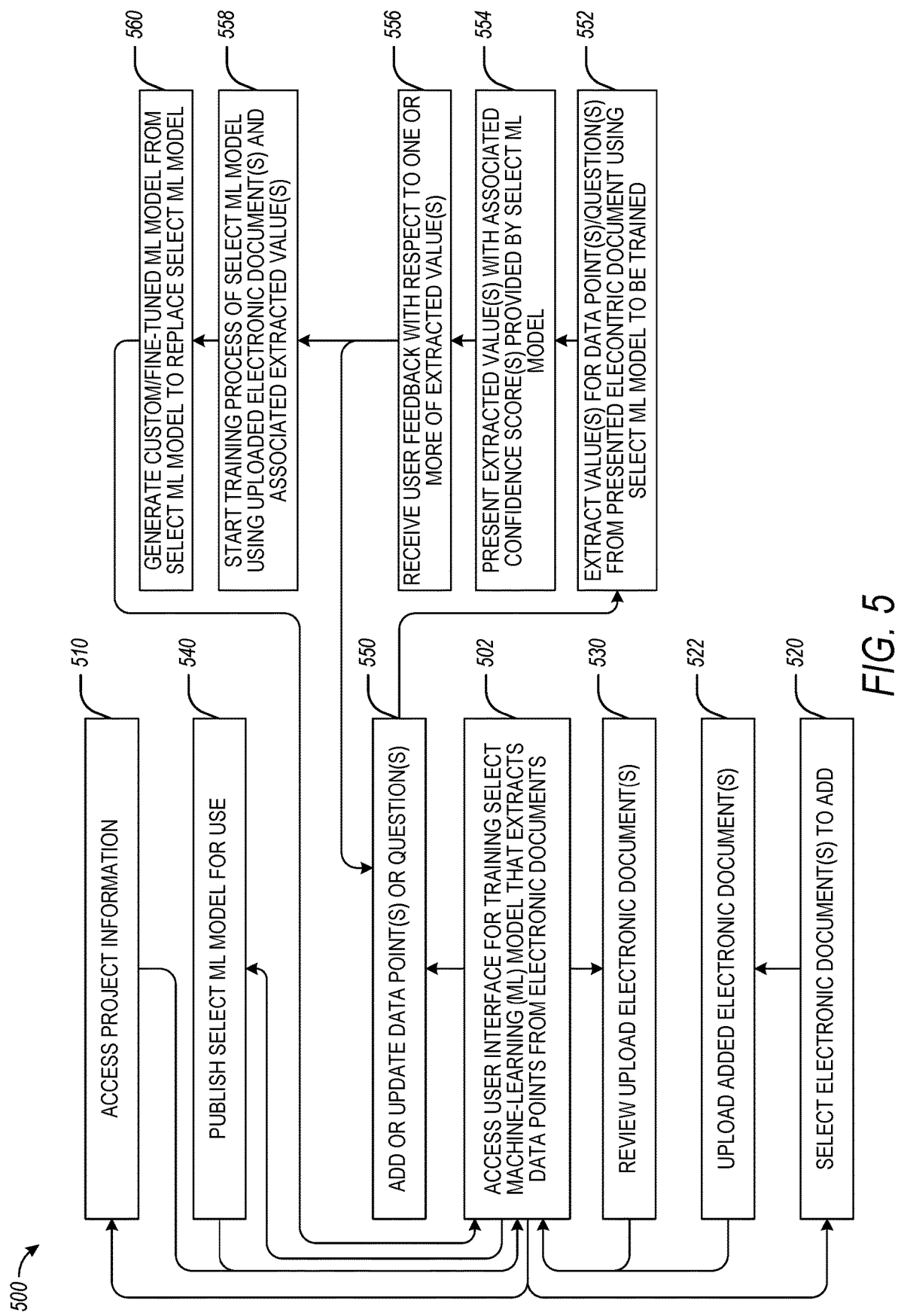
FIG. 5 is a flowchart of example user workflow for generating a machine-learning (ML) model for extracting information from one or more electronic documents, according to some embodiments.

As previously mentioned, the compute service manager 108 includes the ML generator 132 configured to generate ML model for extracting information from one or more electronic documents according to various embodiments, which are further discussed herein with respect to least FIGS. 4 and 5.

FIG. 3 is a block diagram illustrating components of the execution platform 110, according to some embodiments. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues and network overhead). In some embodiments, the imbalances are addressed at the scan level using a file-stealing scheme. In particular, whenever a node process completes scanning its set of input files, it requests additional files from other nodes. If one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud storage platform 104 (e.g., from data storage device 120-1), and does not download the files from the transferring node. In this way, lagging nodes can transfer files via file stealing in a way that does not worsen the load on the lagging nodes.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some embodiments, table data can be divided into one or more micro-partitions, which are contiguous units of storage. As used herein, the terms "partition files" (or "partition data files") and micro-partitions are interchangeable. In this regard, source table data can be stored as multiple partition files associated with the source table.

FIG. 4 is a flowchart of an example method 400 for generating a machine-learning (ML) model for extracting information from one or more electronic documents, according to some embodiments. Method 400 may be embodied in computer-readable instructions for execution by one or more hardware components (e.g., one or more processors) such that the operations of method 400 can be performed by components of the network-based database system 102, such as a network node (e.g., the ML generator 132 executing on a network node of the compute service manager 108) or a computing device (e.g., client device 114), one or both of which may be implemented as machine 1200 of FIG. 12 performing the disclosed functions. Accordingly, method 400 is described below, by way of example with reference thereto. However, it shall be appreciated that method 400 may be deployed on various other hardware configurations and is not intended to be limited to deployment within the network-based database system 102.

At operation 402, one or more hardware processors cause presentation of a user interface for training a select machine-learning (ML) model (e.g., a foundational or a pre-trained ML model), where the select ML model is configured to extract values for one or more data points from electronic documents. The select ML model can serve as a base ML model (e.g., initial base ML model) from which a user can train to generate a custom ML model (e.g., one fine-tuned for extraction information from electronic documents that contain certain type of information content, such as a bank statement, billing statement, or a resume) as described herein. Additionally, the select model can be a version of the select ML model that was previously generated (e.g., fine-tuned) and the user is looking to train (e.g., fine-tune) further. FIG. 6 illustrates an example user interface for creating a project (as described herein) that facilitates training (e.g., fine-tuning) of a ML model for extraction of information from electronic documents. An example user interface illustrated by FIG. 7 can facilitate uploading of one or more electronic documents in association with an existing or created project.

At operation 404, the one or more hardware processors add or revise at least one of a set of data points or a set of questions corresponding to the set of data points (e.g., the set of questions being associated with the set of data points) based on one or more user interactions received by the user interface. For various embodiments, a ML model uses a given data point (e.g., having a data point name or label) and its associated question to extract a value for the data point from an electronic document, where the associated question specifies to the ML model what value is to be extracted from the electronic document. For instance, a user can access a user interface that permits the user to add a new data point with an associated question, or revise an existing data point and its existing associated question. Example user interfaces that facilitate a user adding or revising the set of data points or the set of questions are illustrated with respect to FIGS. 8-11.

At operation 406, the one or more hardware processors cause presentation of an uploaded electronic document in the user interface. Example user interfaces that present the uploaded electronic document are illustrated with respect to FIGS. 8 and 11.

At operation 408, the one or more hardware processors use the select ML model to extract, from the uploaded electronic document, a set of values for at least the set of data points based on the corresponding set of questions.

At operation 410, the one or more hardware processors cause presentation of the set of values with the set of data points, the set of questions, and a set of confidence scores for the set of values. Example user interfaces that present data points, questions, and confidence scores are illustrated with respect to FIGS. 9-11.

At operation 412, the one or more hardware processors receive, by the user interface, user feedback with respect to one or more of the set of values. Depending on the embodiment, the user feedback can comprise a user's acceptance (e.g., by clicking an acceptable graphical button) of an extracted value that is presented in the user interface, the user's rejection (e.g., by clicking a rejection graphical button) of the extracted value, or the user's change (e.g., modification, adjustment, or correction) of the extracted value. The user feedback can represent annotations to the electronic document. As described herein, eventually, the user feedback can be used to adjust (e.g., train or fine-tune) the select ML model during a training process.

At operation 414, the one or more hardware processors perform a training process on the select ML model to generate a custom ML model from the select ML model based on the user feedback and the uploaded electronic document. For example, a user can click on a graphical button that can initiate the training process on the select ML model based on the user feedback, which can include one or more acceptances, rejections, or adjustments of extracted values by the user. The result of operation 414 is a custom (e.g., fine-tuned) ML model. For various embodiments, the custom ML model is a data object, which can be used in a database statement or with a document information extraction pipeline as described herein.

At operation 416, the one or more hardware processors publish the custom ML model as a data object for use in extracting the set of data points from electronic documents. During operation 416, the data object of the custom ML model can be stored (e.g., for future retrieval and use) and made available for a user (e.g., ML engineer) to use as part of a database command or function (e.g., SQL command or function) or to setup or generate a document information extraction pipeline. The document information extraction pipeline can comprise (or can represent) a document information extraction process or software service that is continuously running. The document information extraction pipeline can be configured to: monitor for one or more input electronic documents; receive and ingest (e.g., continuously ingest) the one or more input electronic documents (e.g., stream of different electronic documents) of various types; process each of the electronic documents using the data object (that corresponds to the custom ML model as published) to extract values for at least the set of data points from each of the electronic documents; and store the extracted values in one or more tables (e.g., target tables) or stages of a data platform. For some embodiments, the document information extraction pipeline can be configured or established (e.g., generated) by way of a database command or function, which can reference the data object corresponding to the customer ML model.

FIG. 5 is a flowchart of example user workflow 500 for generating a machine-learning (ML) model for extracting information from one or more electronic documents, according to some embodiments. For some embodiments, the method 400 of FIG. 4 implements at least some portion of the user workflow 500. Starting with operation 502, where a user accesses a user interface for training a select ML model that extracts one or more data points from electronic documents. From operation 502, the user workflow 500 can proceed to one of operations 510, 520, 530, 540, or 550.

At operation 510, the user accesses (e.g., to review or to modify) information for a project associated with a select ML model to be trained by way of the user interface. The information can include a project name, name of the user that owns the project, number of electronic documents already uploaded (e.g., for training or for processing) and associated with the project, a version number of the project, or a base ML model from which the select ML model was generated. After operation 510, the user workflow 500 can return to operation 502.

At operation 520, the user selects one or more electronic documents to be added to the project, where the added one or more electronic documents can be used to explore (e.g., test) the select ML model, to train the select ML model, or both. Subsequently, at operation 522, the user can select to upload the added one or more electronic documents to the project. After operation 522, the user workflow 500 can return to operation 502.

At operation 530, the user reviews one or more of the electronic documents uploaded to the project to be reviewed by causing the one or more electronic documents to be presented in the user interface. After operation 530, the user workflow 500 can return to operation 502.

At operation 540, the user selects the select ML model to be used for the project to extract one or more values from electronic documents for data points. As described herein, the select ML model can be a previous version of the select ML model, a foundational ML model (e.g., zero-shot ML model), a pre-trained ML model, or the like.

At operation 550, the user chooses to add one or more new data points to an existing set of data points (e.g., of the project), to add one or more new questions to an existing set of questions corresponding to the existing set of data points, to update one or more in the existing set of data points, or to update one or more of the existing set of questions. As described herein, the select ML model is to be used to extract values for all of the existing set of data points using questions corresponding to the existing set of data points. At operation 552, one or more hardware processors use the select ML model to extract, from a currently presented electronic document, one or more values for the existing set of data points (e.g., of the project), where the ML model uses a set of questions corresponding to the existing set of data points to perform the extraction. At operation 554, the one or more hardware processors present the one or more extracted values in the user interface with their corresponding confidence scores as provided by the select ML model. At operation 556, the one or more hardware processors receive user feedback (e.g., acceptance, rejection, value modification) from the user with respect to one or more of the extracted values. After operation 556, the user workflow 500 can return to operation 550, where the user adds/revises one or more data points or one or more corresponding questions at operation, or the user workflow 500 can proceed to operation 558, where the user starts a training process of the select ML model using one or more uploaded electronic documents and associated extracted values as accepted, rejected, or modified (e.g., corrected) by user feedback. At operation 560, the one or more hardware processor performs generate a custom (e.g., fine-tuned) ML model from the select ML model (e.g., version of the select ML model used during operation 552) by performing the training process on the select ML model using one or more uploaded electronic documents and associated extracted values as accepted, rejected, or modified by user feedback. After operation 550, the user workflow 500 can return to operation 502.

FIG. 6 illustrates an example user interface 600 for adding (e.g., creating) a new project for a ML model used for document information extraction, according to some embodiments. As shown, a user can enter a new project name at field 602, and can select from a selection 604 a standard ML model (e.g., foundational ML model) or a pre-trained ML model (specifically, one pre-trained for invoice electronic documents, or one pre-trained for pay stub electronic documents) as the ML model of the new project.

Figure 7:
FIG. 7 illustrates an example user interface for uploading one or more electronic documents to a project associated with a ML model used for document information extraction, according to some embodiments.

FIG. 7 illustrates an example user interface 700 for uploading one or more electronic documents to a project associated with a ML model used for document information extraction, according to some embodiments.

Figure 8:
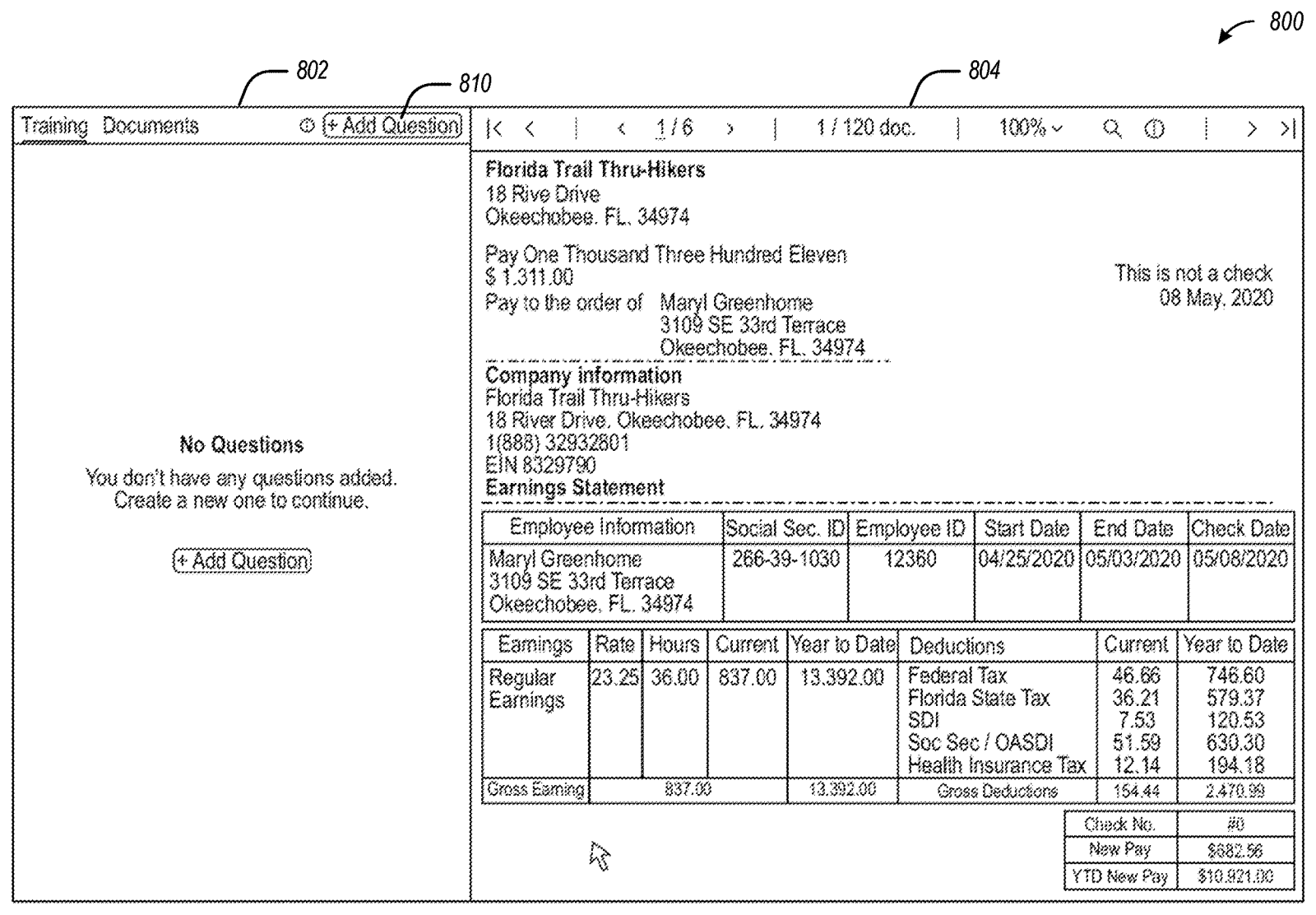

FIGS. 8-11 illustrate example user interfaces that present electronic documents, present data points, present questions associated with data points, present extracted values associated with data points, present confidence scores, receive user feedback, and start a training process of a ML model, according to some embodiments. Referring now to FIG. 8, user interface 800 is divided into a left viewing pane 802 and a right viewing pane 804. As shown in FIG. 8, the left viewing pane 802 can permit a user to add one or more questions (via an add question button 810) under a TRAINING tab, which correspond to one or more data points for which values will be extracted from the one or more uploaded documents. The left viewing pane 802 can also permit a user to switch over to a DOCUMENTS tab, which would allow the user to access a listing of uploaded documents (e.g., uploaded by the user for training the ML model of the project). The right viewing pane 804 can be used by a user to review content (e.g., review one or more pages of a given uploaded document) of one or more uploaded documents presented through the user interface 800.

Referring now to FIG. 9, user interface 900 can represent an example of the left pane 802 of user interface 800 of FIG. 9. User interface 900 presents data points 902-1 through 902-4 of the project, presents questions 904-1 through 904-4 associated with those data points, presents values 906-1 through 906-4 extracted (e.g., extracted from a given electronic document that is currently presented via the user interface 800) for those data points, and presents confidence scores 908-1 through 908-4 provided by the ML model for extracted values. As shown, based on the question 904-4 entered by the user, the ML model extracted multiple values (906-4) for the data point 902-4 from an electronic document (e.g., a given electronic document that is currently being presented via the right viewing pane 804 of the user interface 800 of FIG. 8). Through the user interface 900, a user can change (e.g., adjust or modify) one or more of the data points, or one or more of the questions. Additionally, the user interface 900 can permit a user to provide user feedback with respect to one or more of the extracted values, such as acceptance of an extracted value (e.g., via selecting the check mark associated with the extracted value), rejection of an extracted value (e.g., via selecting the X mark associated with the extracted value), or change (e.g., modification, adjustment, correction) of the extracted value (e.g., by entering a new or modified value in place of the extracted value).

Figure 10:
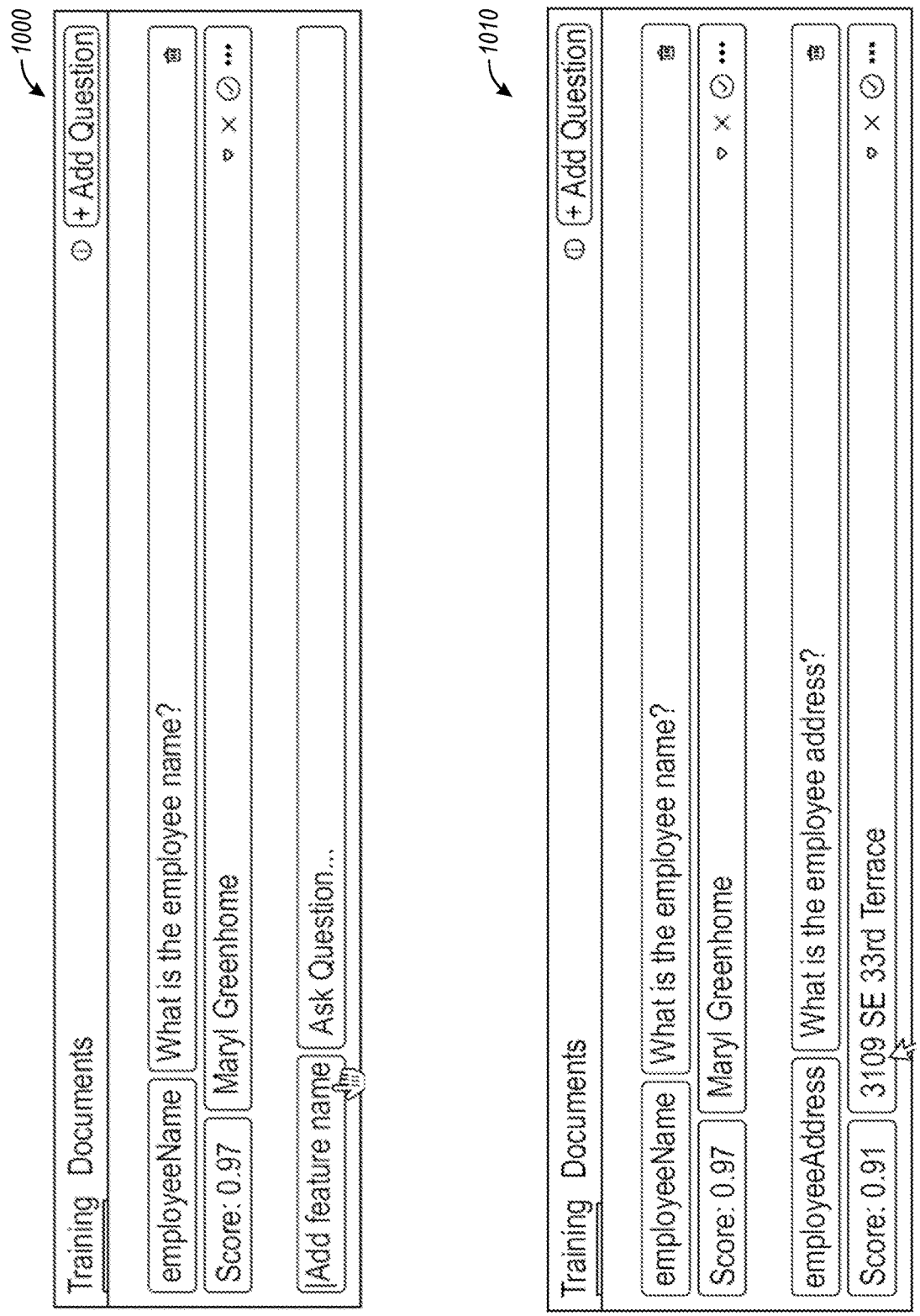

Referring now to FIG. 10, user interface 1000 illustrates how a user can add a new data point (e.g., new feature name) with a new question (e.g., "Ask question . . . "), and the user interface 1010 of FIG. 10 illustrates how the user interface 1010 is updated with: a value extracted (e.g., extracted from a given electronic document that is currently being presented via the right viewing pane 804 of the user interface 800 of FIG. 8) by the ML model for the newly added data point using the newly added question; and a confidence score (e.g., 0.91) provided by the ML model for the extracted value. User interface 1100 of FIG. 11 illustrates an example combination of the user interface 800 (that displays a current uploaded electronic document) with the user interface 1010.

Figure 12:
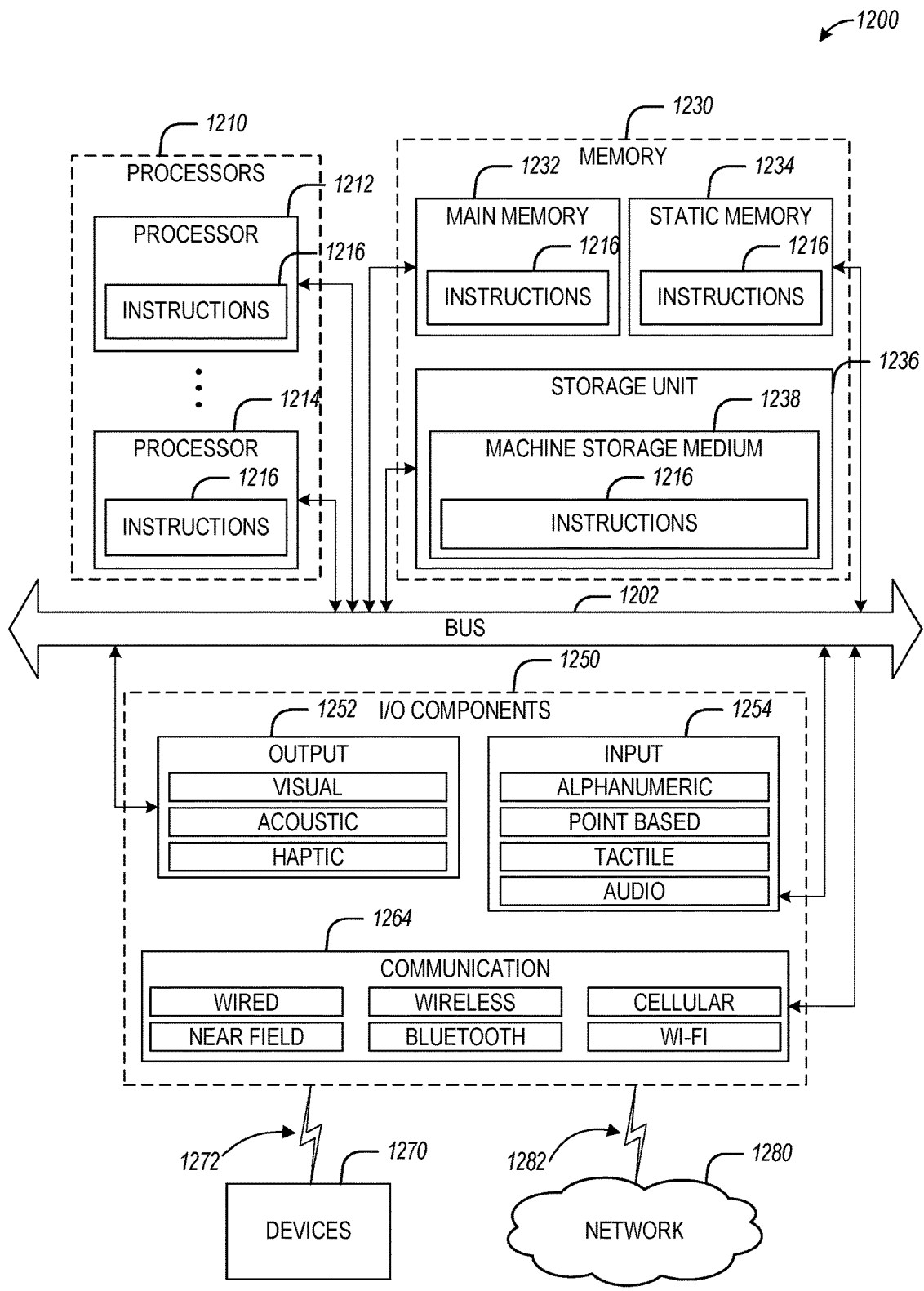
FIG. 12 illustrates a diagrammatic representation of a machine in the form of a computer system within which a set of instructions may be executed for causing the machine to perform any one or more of the methodologies discussed herein, according to some embodiments.

FIG. 12 illustrates a diagrammatic representation of machine 1200 in the form of a computer system within which a set of instructions may be executed for causing machine 1200 to perform any one or more of the methodologies discussed herein, according to an embodiment. Specifically, FIG. 12 shows a diagrammatic representation of machine 1200 in the example form of a computer system, within which instructions 1216 (e.g., software, a program, an application, an applet, an app, or other executable code) for causing the machine 1200 to perform any one or more of the methodologies discussed herein may be executed. For example, instructions 1216 may cause machine 1200 to execute any one or more operations of method 400 (or any other technique discussed herein). As another example, instructions 1216 may cause machine 1200 to implement one or more portions of the functionalities discussed herein. In this way, instructions 1216 may transform a general, non-programmed machine into a particular machine 1200 (e.g., the client device 114, the compute service manager 108, or a node in the execution platform 110) that is specially configured to carry out any one of the described and illustrated functions in the manner described herein. In yet another embodiment, instructions 1216 may configure the client device 114, the compute service manager 108, and/or a node in the execution platform 110 to carry out any one of the described and illustrated functions in the manner described herein, which functions can be configured or performed by the ML generator 132.

In alternative embodiments, the machine 1200 operates as a standalone device or may be coupled (e.g., networked) to other machines. In a networked deployment, machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

Machine 1200 includes processors 1210, memory 1230, and input/output (I/O) components 1250 configured to communicate with each other such as via a bus 1202. In some embodiments, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors (sometimes referred to as "cores") that may execute instructions 1216 contemporaneously. Although FIG. 12 shows multiple processors 1210, machine 1200 may include a single processor with a single core, a single processor with multiple cores (e.g., a multi-core processor), multiple processors with a single core, multiple processors with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 stores the instructions 1216 embodying any one or more of the methodologies or functions described herein. The instructions 1216 may also reside, completely or partially, within the main memory 1232, within the static memory 1234, within machine storage medium 1238 of the storage unit 1236, within at least one of the processors 1210 (e.g., within the processor's cache memory), or any suitable combination thereof, during execution thereof by the machine 1200.

The I/O components 1250 include components to receive input, provide output, produce output, transmit information, exchange information, capture measurements, and so on. The specific I/O components 1250 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, communication components 1264 may include a network interface component or another suitable device to interface with network 1280. In further examples, communication components 1264 may include wired communication components, wireless communication components, cellular communication components, and other communication components to provide communication via other modalities. The device 1270 may be another machine or any of a wide variety of peripheral devices (e.g., a peripheral device coupled via a universal serial bus (USB)). For example, as noted above, machine 1200 may correspond to any one of the client devices 114, the compute service manager 108, or the execution platform 110, and device 1270 may include the client device 114 or any other computing device described herein as being in communication with the network-based database system 102 or the cloud storage platform 104.

The various memories (e.g., 1230, 1232, 1234, and/or memory of the processor(s) 1210 and/or the storage unit 1236) may store one or more sets of instructions 1216 and data structures (e.g., software) embodying or utilized by any one or more of the methodologies or functions described herein. These instructions 1216, when executed by the processor(s) 1210, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 1280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1280 or a portion of network 1280 may include a wireless or cellular network, and coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 may be transmitted or received over the network 1280 using a transmission medium via a network interface device (e.g., a network interface component included in the communication components 1264) and utilizing any one of several well-known transfer protocols (e.g., hypertext transfer protocol (HTTP)). Similarly, instructions 1216 may be transmitted or received using a transmission medium via coupling 1272 (e.g., a peer-to-peer coupling or another type of wired or wireless network coupling) to device 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: causing presentation of a user interface for training a select machine-learning model, the select machine-learning model being configured to extract values for one or more data points from electronic documents; adding, by the user interface, a set of data points and a set of questions, the set of questions corresponding to the set of data points; using the select machine-learning model to extract, from an uploaded electronic document, at least a set of values for the set of data points based on the set of questions; causing presentation of the set of data points, the set of values, and the set of questions in the user interface; receiving, by the user interface, user feedback with respect to one or more of the set of values; performing a training process on the select machine-learning model to generate a custom machine-learning model from the select machine-learning model based on the user feedback and the uploaded electronic document; and publishing the custom machine-learning model as a data object for use in extracting values for at least the set of data points from one or more electronic documents.

In Example 2, the subject matter of Example 1 includes, wherein the operations comprise: causing presentation of the uploaded electronic document in the user interface.

In Example 3, the subject matter of Examples 1-2 includes, wherein the operations comprise: receiving, by the user interface, a user interaction for revising at least one data point in the set of data points.

In Example 4, the subject matter of Examples 1-3 includes, wherein the operations comprise: receiving, by the user interface, a user interaction for revising at least one question in the set of questions.

In Example 5, the subject matter of Examples 1-4 includes, wherein the select machine-learning model provides a set of confidence scores for the set of values, and wherein the operations comprise: causing presentation of the set of confidence scores with the set of values in the user interface.

In Example 6, the subject matter of Examples 1-5 includes, wherein the user feedback comprises a user acceptance of at least one value in the set of values.

In Example 7, the subject matter of Examples 1-6 includes, wherein the user feedback comprises a user rejection of at least one value in the set of values.

In Example 8, the subject matter of Examples 1-7 includes, wherein the user feedback comprises a user modification of at least one value in the set of values.

In Example 9, the subject matter of Examples 1-8 includes, wherein the user interface is a first user interface, and wherein the operations comprise after the publishing of the custom machine-learning model as the data object: causing presentation of a second user interface for selecting from a set of published machine-learning model, the set of published machine-learning model comprising the custom machine-learning model; receiving, by the second user interface, a user selection of the custom machine-learning model for a document information extraction software service; and in response to the user selection, configuring the document information extraction software service to receive an input electronic document, extract a set of extracted values from the input electronic document using the data object that corresponds to the custom machine-learning model, and storing the set of extracted values in one or more target tables on a data platform.

Example 10 is a method to implement of any of Examples 1-9.

Example 11 is a machine-storage medium comprising instructions that, when executed by one or more hardware processors of a machine, configure the machine to perform operations to implement of any of Examples 1-9.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
      causing presentation of a user interface for training a select machine-learning model, the select machine-learning model being configured to extract values for one or more data points from electronic documents;

adding, by the user interface, a set of data points and a set of questions, the set of questions corresponding to the set of data points;

using the select machine-learning model to extract, from an uploaded electronic document, at least a set of values for the set of data points based on the set of questions;

causing presentation of the set of data points, the set of values, and the set of questions in the user interface;

receiving, by the user interface, user feedback with respect to one or more of the set of values;

performing a training process on the select machine-learning model to generate a custom machine-learning model from the select machine-learning model based on the user feedback and the uploaded electronic document;

publishing the custom machine-learning model as a data object for use in extracting values for at least the set of data points from one or more electronic documents;

receiving a user selection of the custom machine-learning model for a document information extraction software service; and in response to the user selection, configuring the document information extraction software service to:
  receive an input electronic document;
  extract a set of extracted values from the input electronic document using the data object that corresponds to the custom machine-learning model; and
  store the set of extracted values in one or more target tables on a data platform.

2. The system of claim 1, wherein the operations comprise:
causing presentation of the uploaded electronic document in the user interface.

3. The system of claim 1, wherein the operations comprise:
receiving, by the user interface, a user interaction for revising at least one data point in the set of data points.

4. The system of claim 1, wherein the operations comprise:
receiving, by the user interface, a user interaction for revising at least one question in the set of questions.

5. The system of claim 1, wherein the select machine-learning model provides a set of confidence scores for the set of values, and wherein the operations comprise:
causing presentation of the set of confidence scores with the set of values in the user interface.

6. The system of claim 1, wherein the user feedback comprises a user acceptance of at least one value in the set of values.

7. The system of claim 1, wherein the user feedback comprises a user rejection of at least one value in the set of values.

8. The system of claim 1, wherein the user feedback comprises a user modification of at least one value in the set of values.

9. The system of claim 1, wherein the user interface is a first user interface, and wherein the operations comprise:
after the publishing of the custom machine-learning model as the data object:
  causing presentation of a second user interface for selecting from a set of published machine-learning model, the set of published machine-learning model comprising the custom machine-learning model, the user selection being received via the second user interface.

10. A machine-storage medium comprising instructions that, when executed by one or more processors of a machine, configure the machine to perform operations comprising:
causing presentation of a user interface for training a select machine-learning model, the select machine-learning model being configured to extract values for one or more data points from electronic documents;

adding, by the user interface, a set of data points and a set of questions, the set of questions corresponding to the set of data points;

using the select machine-learning model to extract, from an uploaded electronic document, at least a set of values for the set of data points based on the set of questions;

causing presentation of the set of data points, the set of values, and the set of questions in the user interface;

receiving, by the user interface, user feedback with respect to one or more of the set of values;

performing a training process on the select machine-learning model to generate a custom machine-learning model from the select machine-learning model based on the user feedback and the uploaded electronic document;

publishing the custom machine-learning model as a data object for use in extracting values for at least the set of data points from one or more electronic documents;

receiving a user selection of the custom machine-learning model for a document information extraction software service; and in response to the user selection, configuring the document information extraction software service to:
  receive an input electronic document;
  extract a set of extracted values from the input electronic document using the data object that corresponds to the custom machine-learning model; and
  store the set of extracted values in one or more target tables on a data platform.

11. The machine-storage medium of claim 10, wherein the operations comprise:
causing presentation of the uploaded electronic document in the user interface.

12. The machine-storage medium of claim 10, wherein the operations comprise:
receiving, by the user interface, a user interaction for revising at least one data point in the set of data points.

13. The machine-storage medium of claim 10, wherein the operations comprise:
receiving, by the user interface, a user interaction for revising at least one question in the set of questions.

14. The machine-storage medium of claim 10, wherein the select machine-learning model provides a set of confidence scores for the set of values, and wherein the operations comprise:
causing presentation of the set of confidence scores with the set of values in the user interface.

15. The machine-storage medium of claim 10, wherein the user feedback comprises a user acceptance of at least one value in the set of values.

16. The machine-storage medium of claim 10 wherein the user feedback comprises a user rejection of at least one value in the set of values.

17. The machine-storage medium of claim 10, wherein the user feedback comprises a user modification of at least one value in the set of values.

18. The machine-storage medium of claim 10, wherein the user interface is a first user interface, and wherein the operations comprise:

after the publishing of the custom machine-learning model as the data object:

causing presentation of a second user interface for selecting from a set of published machine-learning model, the set of published machine-learning model comprising the custom machine-learning model, the user selection being received via the second user interface.

19. A method comprising:

causing presentation, by one or more hardware processors, of a user interface for training a select machine-learning model, the select machine-learning model being configured to extract values for one or more data points from electronic documents;

adding, by the one or more hardware processors and by the user interface, a set of data points and a set of questions, the set of questions corresponding to the set of data points;

using, by the one or more hardware processors, the select machine-learning model to extract, from an uploaded electronic document, at least a set of values for the set of data points based on the set of questions;

causing presentation, by the one or more hardware processors, of the set of data points, the set of values, and the set of questions in the user interface;

receiving, by the one or more hardware processors and by the user interface, user feedback with respect to one or more of the set of values;

performing, by the one or more hardware processors, a training process on the select machine-learning model to generate a custom machine-learning model from the select machine-learning model based on the user feedback and the uploaded electronic document;

publishing, by the one or more hardware processors, the custom machine-learning model as a data object for use in extracting values for at least the set of data points from one or more electronic documents;

receiving, by the one or more hardware processors, a user selection of the custom machine-learning model for a document information extraction software service; and in response to the user selection, configuring, by the one or more hardware processors, the document information extraction software service to:

receive an input electronic document;

extract a set of extracted values from the input electronic document using the data object that corresponds to the custom machine-learning model; and store the set of extracted values in one or more target tables on a data platform.

20. The method of claim 19, wherein the select machine-learning model provides a set of confidence scores for the set of values, and wherein the method comprises:

causing presentation of the set of confidence scores with the set of values in the user interface.

\* \* \* \* \*